(12) United States Patent
Nelson

(10) Patent No.: US 7,513,700 B2
(45) Date of Patent: Apr. 7, 2009

(54) IMAGE ELEMENT IDENTIFIER

(75) Inventor: Joakim Nelson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 500 days.

(21) Appl. No.: 11/438,088

(22) Filed: May 22, 2006

(65) Prior Publication Data

US 2007/0147828 A1    Jun. 28, 2007

Related U.S. Application Data

(60) Provisional application No. 60/749,621, filed on Dec. 13, 2005.

(51) Int. Cl.
*G03B 17/00* (2006.01)
*A63F 13/04* (2006.01)

(52) U.S. Cl. .................. 396/420; 396/422; 348/552; 463/37; 463/39

(58) Field of Classification Search ......... 396/419–420, 396/422, 429; 348/552; 463/37, 39
See application file for complete search history.

(56) References Cited

U.S. PATENT DOCUMENTS 4,395,045 A    7/1983   Baer
5,138,304 A *  8/1992   Bronson ................. 345/157

2005/0107160 A1 *   5/2005   Cheng et al. .................. 463/37

FOREIGN PATENT DOCUMENTS

| EP | 1 110 587 A1 | 6/2001 |
| WO | WO 2000/060534 | 10/2000 |
| WO | WO 2004/047011 A2 | 6/2004 |

OTHER PUBLICATIONS

International Search Report in PCT Application No. PCT/EP2006/066187, dated Jul. 11, 2006, 2 pages.

* cited by examiner

*Primary Examiner*—Bot LeDynh
(74) *Attorney, Agent, or Firm*—Harrity & Harrity, LLP

(57) ABSTRACT

A method for providing positioning information related to image information presentation for a portable communication device, includes providing first image information to be presented (202), obtaining the first image information by the portable communication device under control of the user of the portable communication device, registering second image information by the camera of the portable communication device (206) and mapping presented first image information and registered second image information (208). The method may also include recognizing at least one image element of the presented first image information as being included in the registered second image information (210) and determining the position of a predefined area of the registered second image information in relation to the recognized at least one image element (212). The determined relative position of the predefined area may be used for controlling purposes of the first image information being presented.

12 Claims, 3 Drawing Sheets

IMAGE ELEMENT IDENTIFIER

RELATED APPLICATIONS

This application claims priority under 35 U.S.C. § 119 based on U.S. Provisional application Ser. No. 60/749,621, filed Dec. 13, 2005, the disclosure of which is incorporated herein by reference.

TECHNICAL FIELD OF THE INVENTION

The invention relates in general to controlling presentation of image information, and in particular to providing positioning information related to the presentation of image information.

DESCRIPTION OF RELATED ART

Electronic games within portable electronic devices have recently developed into advanced and complex games requiring large memory space. Portable communication devices, such as mobile phones, may be found having memories of 0.5 Gb or more.

Whereas the games have increased in complexity, the size of the screen of the mobile phones, being one example of portable communication devices, has not had the same development. Screens are still relatively small, which sets limitations to the user experience when gaming.

Gaming using large screens is well known and was performed in the early days of electronic games, such as in television games using TV-sets as screens or in personal computer games using the computer cathode ray tubes as screens.

Interactions between the user of the game and the displayed gaming information were allowed in television target aiming and shooting games. The television games typically provided a photo sensitive gun capable of sensing large bright target symbols on the screen of a television receiver. The targets were distinctly displayed on the screen when imaged using a gun-mounted electro-optical sensor resulting in a series of output pulses indicating that the gun was indeed lined up properly with the target and a hit was scored. None of these attempted to show where the user was aiming when he pulled the trigger preceding a miss or for that matter, how closely to the center of the target on screen he was aiming when he made a hit.

In U.S. Pat. No. 4,395,045, a television precision target shooting apparatus and method simulate shooting at displayed images on the screen of a television set using a simulated gun that provides indication on the screen of where the gun was pointed at the time of trigger pull. This is achieved by flashing the screen white subsequent a trigger pull in order for a photo sensor within the gun to respond to short segments of horizontal raster lines such that by counting vertical lines and time intervals with respect to vertical and horizontal synchronization pulses, respectively, identification of where on the screen the gun was pointing is achieved. This permits a symbol to be displayed upon a screen at that location.

These techniques to identify a flashing item by using a photo optical sensor may, however, not be used for a plurality of identical targets, since each individual position is associated with unique position descriptors, such as vertical lines and time intervals.

There are also other techniques with which a user could directly interact with an image presentation. By using a directing or pointing device, the direction in which such a device is directed or pointed can be determined.

In one technique, a gyro is used which is built in the directing device and which reacts to lateral and longitudinal motions of the directing device. Any lateral and longitudinal motions causing lateral and longitudinal displacements are related to a reference position, by which an updated position can be calculated. The application of such a directing device in gaming may allow the position of a cursor or symbol to be determined and displayed on a screen.

An alternative to using a gyro to determine an updated position of a cursor or symbol on a screen is to use an accelerometer included in the directing or pointing device. Any motions of the directing or pointing device are detected by the accelerometer, and then converted to a displacement of the location where the directing or pointing device is pointing. A cursor may therefore also be displayed on the screen by using this technique.

These two directing techniques are based on motions relative to a reference direction, for which reason these techniques become inapplicable for determining a plurality of positions of targets on a screen.

There is hence a need to overcome the limitations of prior art techniques and to provide a technique that is more flexible and applicable to the positioning of a plurality of targets.

SUMMARY OF THE INVENTION

Aspects of the invention are directed towards solving the problem of interactively controlling an image presentation as displayed on a large screen, using a portable communication device.

Aspects consistent with the invention provide a method for comparing image information being registered with image information being presented using a light registering camera unit of the portable communication device.

According to one aspect of the invention, a method of providing positioning information related to a presentation of image information for a portable communication device, comprises providing first image information to be presented by an image information presentation unit, obtaining the first image information by the portable communication device under control of the user of the portable communication device, registering second image information by the camera of the portable communication device, mapping presented first image information and registered second image information, recognizing at least one image element of the presented first image information as being included in the registered second image information, and determining the position of a predefined area of the registered second image information in relation to the recognized at least one image element, where the determined relative position of the predefined area is used for controlling purposes of the first image information being presented.

A second aspect of the invention is directed towards a method including the features of the first aspect, further comprises the step of sending predefined area position information for displaying the predefined area position on the image information presentation unit.

A third aspect of the invention is directed towards a method including the features of the first aspect, wherein the step of determining the position of the predefined area comprises determining the position of the center area of second registered image information.

A fourth aspect of the invention is directed towards a method including the features of the first aspect, further comprising obtaining updated directing of the camera of the portable communication device under the control of the user of the portable communication device.

A fifth aspect of the invention is directed towards a method including the features of the first aspect, further comprising the step of receiving user input by the portable communication device, which user input is used as input data for controlling the first image information being presented.

A sixth aspect of the invention is directed towards a method including the features of the fourth aspect, further comprising the step of controlling the first image information being presented based on at least one of the obtained updated directing or received user input.

Other aspects consistent with the invention provide a device for comparing image information being registered with image information being presented, using a light registering camera unit of the portable communication device.

According to a seventh aspect of the invention, a portable communication device for providing positioning information related to a presentation of a first image information, comprises an image information providing unit, arranged to provide a first image information to an image information presentation unit, a light registering camera unit, arranged to register second image information when being directed towards the image presentation unit, a mapping unit, connected to the light registering camera unit and arranged to map the first image information and the second image information, and a control unit arranged to control providing of the first image information to an image information unit, to control registering second image information by the light registering camera unit, and to control mapping of the first image information and the second image information, and further arranged to recognize at least one image element of the presented first image information as being included in the second image information, to determine the position of a predefined area of the second registered image information in relation to the recognized at least one image element and use the determined relative position of the predefined area to control the first image information being presented.

An eighth aspect of the invention is directed toward a portable communication device including the features of the seventh aspect and wherein the control unit is further configured to use the determined relative position of the predefined area to control the first image information being presented.

A ninth aspect of the invention is directed towards a portable communication device including the features of the seventh aspect, wherein the portable communication device comprises a mobile phone.

Still other aspects of the invention provide a computer program product comprising a computer readable medium, having thereon computer program code means, to make a portable communication device or a computer execute, comparing image information being registered with image information being presented, using a light registering camera unit of the portable communication device.

According to a tenth aspect of the invention, a computer program product comprising a computer readable medium, having thereon computer program code for execution by a portable communication device or a computer, when said computer program code is loaded in the portable communication device or the computer, to cause the portable communication device or computer perform a method comprising: providing of first image information from the portable communication device or the computer, to be presented by an image information presentation unit, registering second image information by the camera of the portable communication device, mapping presented first image information and registered second image information, recognizing at least one image element of the presented first image information as being included in the second registered image information, and determining the position of a predefined area of the second registered image information in relation to the recognized at least one image element.

An eleventh aspect of the invention is directed to a computer program product including the features of the tenth aspect, where the method performed by the portable communication device or computer further comprises using the determined relative position of the predefined area for controlling the first image information being presented.

Aspects of the invention provide, among other advantages, positioning of an image center relative to recognized surrounding image elements, which enables more advanced gaming using mobile phones in connection with external image presentation units.

The invention may also provide a flexible positioning tool, which also can be used for controlling objects based on relative positioning of cursor movements.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF THE EMBODIMENTS

Aspects consistent with the invention are directed towards solving the problem of interactively controlling an image presentation as displayed on a large screen, using a portable communication device.

Figure 1:
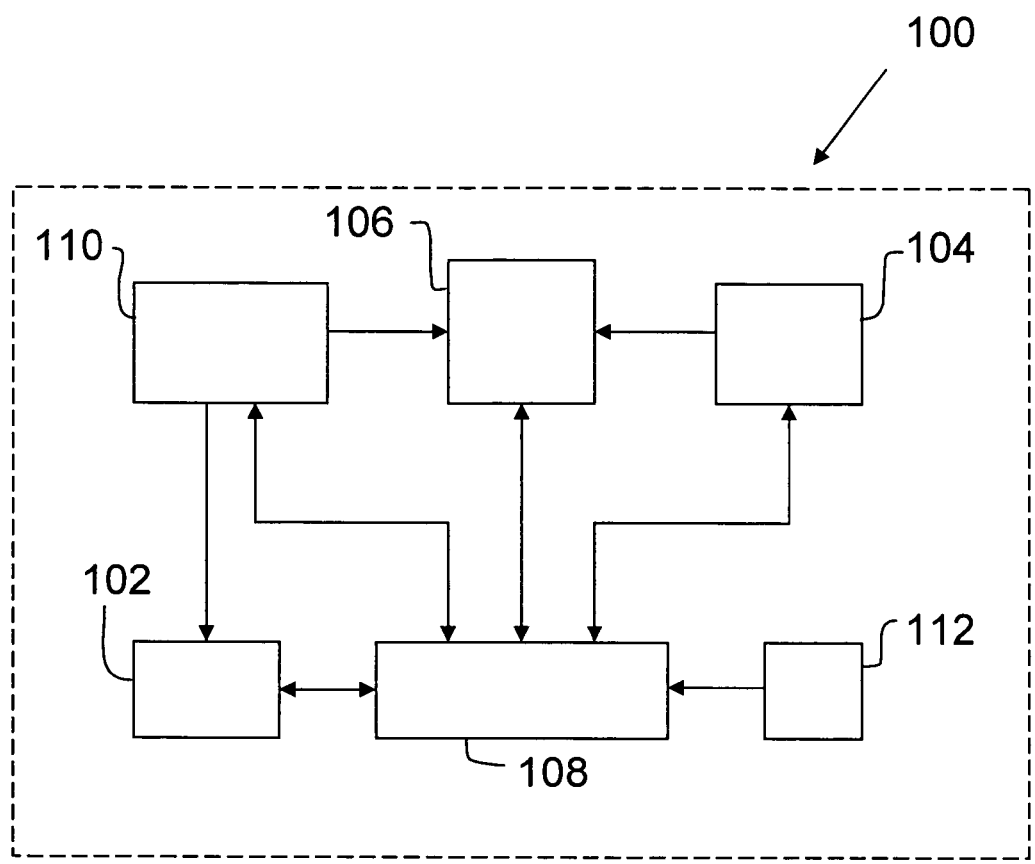
FIG. 1 schematically illustrates an exemplary portable communication device consistent with the invention.

With reference to FIG. 1, schematically showing a portable communication device 100, according to one embodiment of the present invention, the invention is now explained in more detail.

The portable communication device 100 comprises an image information providing unit 102, a light registering camera unit 104, a mapping unit 106, a control unit 108, a memory unit 110, and a user input unit 112. As is shown in FIG. 1, the control unit 108 is connected to all other units. That is, control unit 108 is connected to the image information providing unit 102, the light registering unit 104, the mapping unit 106, the memory unit 110 and the user input unit 112. Moreover, the light registering camera unit 104 and the memory unit 110 are connected to the mapping unit 106. The image information providing unit 102 is further connected to the memory unit 110.

Aspects consistent with the invention use image information that is registered by a light registering camera unit, compare the registered image information with the image information that is being presented, and based on recognized image elements or image objects, to position a predetermined part of the camera image in the image information being presented. By displaying this position, the user of the portable mobile phone, being one example of the communication device 100, can utilize the position of the predetermined part of the camera image relative to the displayed image elements in the image information being presented, to control the image information that is being presented.

Figure 2:
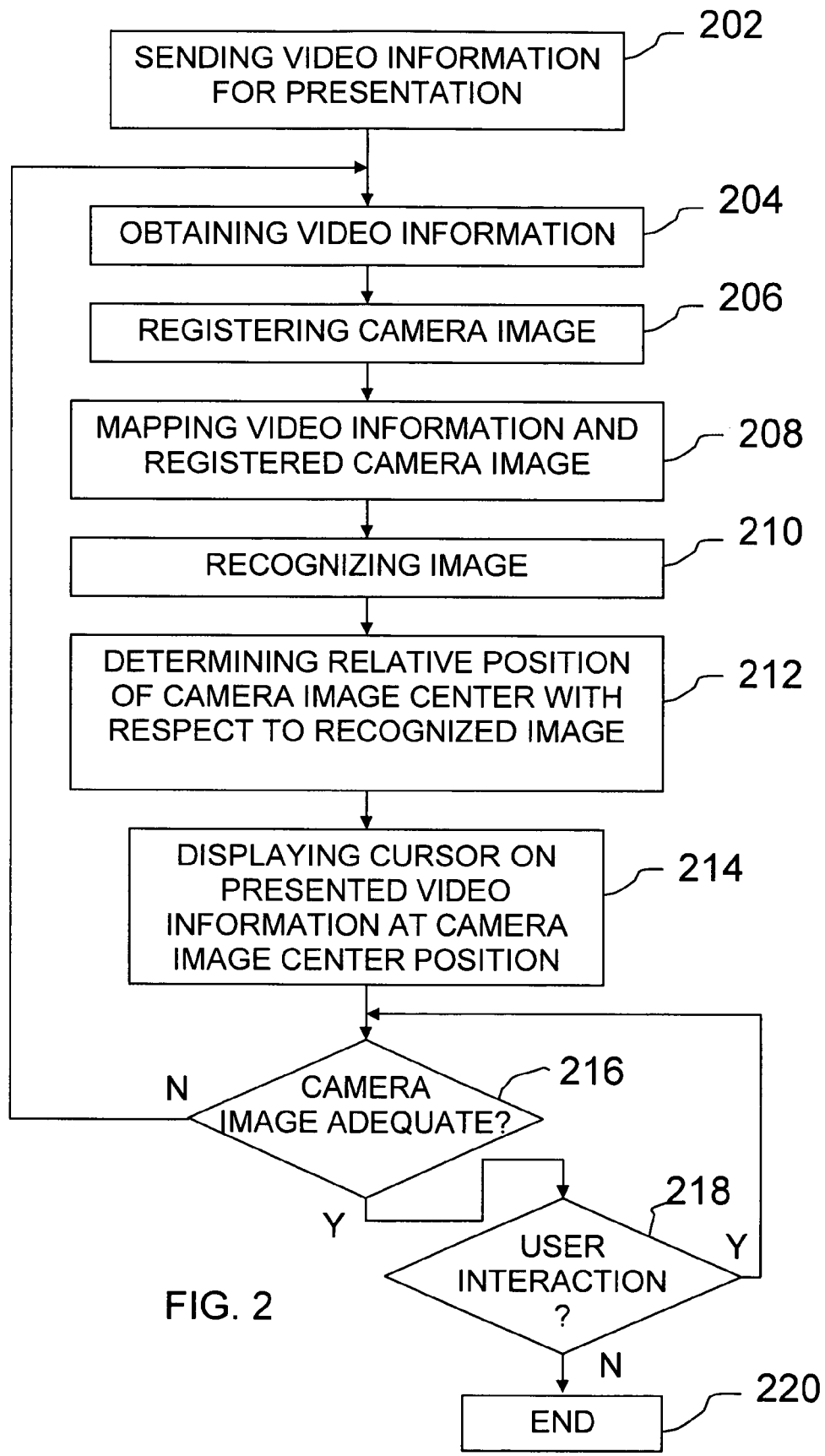
FIG. 2 is a flow chart illustrating processing according to one embodiment of the invention.

By referring to FIG. 2 presenting a flow chart of a method according to one embodiment of the present invention, the method will be described in more detail.

This exemplary method starts with sending video or image information for presentation (step 202). This step is performed by the image information providing unit 102 under control of the control unit 108. Video information is herein understood as comprising image information that may be registered by a camera unit.

Prior to sending the video information, the portable communication device 100 is connected to an image information presentation unit, such a TV-screen, a TV-set, PC-screen, a video projector or the like, to be used for the presentation of the first image information.

The connection between the mobile phone, being one example of the portable communication device 100, and the image information presentation unit is performed using, for example, a universal serial bus (USB) connector, according to one implementation of the present invention.

According to one alternative of the present invention, the connection may be established using Bluetooth technique using a first Bluetooth module either built-in in the mobile phone or associated with it, and a second Bluetooth module connected to or associated with the image information presentation unit.

The mobile phone may send video information, as one example of first image information, to the image information presentation unit.

The method of providing positioning information may also include directing the light registering camera unit 104 of the mobile phone 100 towards the image information presentation unit, under control of the user of the mobile phone 100, and obtaining video information (step 204). That is, the user of mobile phone 100 may use the camera function of mobile phone 100 (i.e., light registering camera unit 104) as a pointer and point the mobile phone 100 in the direction of the image information presentation unit. This step is included since the light registering camera unit 104, within the method of the present invention, is arranged to register light from the image information presentation unit.

According to an alternative embodiment of the invention, the light registering camera unit 104 may detect a change of the direction of the camera included in mobile phone 100 with respect to the image information presentation unit. This change of direction may be caused by the user of the mobile phone 100, such as would occur by the user moving mobile phone 100, or by other influences.

The camera image may then be registered (step 206). That is, the light registering camera unit 104 may register image information, such as image information associated with the video information being presented on the image information presentation unit, as an example of image information that is being presented. The light that is registered by the light registering camera unit 104 may then form the second image information, that will be used to compare to the first image information, as described in more detail below. The step of registering is performed by the light registering camera unit 104 under the control of the control unit 108.

Having registered the camera image as the second image information by the light registering camera unit 104 and having access to the video information (as one example of the first image information), the subsequent step is mapping presented first image information and registered second image information (step 208).

This mapping may be performed by mapping unit 106, being provided with the second image information from the light registering camera unit 104 and first image information from the memory unit 110, under control of the control unit 108.

Since mapping of image or picture information is well known to the skilled person, this mapping step will not be discussed in full detail to not unduly obscure the thrust of the invention. However, it is to be understood that a mapping may include relative size adjustments, rotations and translations of the two kinds of image information.

In an alternative embodiment of the present invention, projection of the first image information at an angle may be used in the step of mapping when mapping the first image information with the registered second image information, since the second image information may have been registered at an angle relative to the presentation of the first image information using the image information presentation unit.

According to another embodiment the step of mapping is performed taking into account shaking of the mobile phone 100, including the light registering camera unit 104, caused by unsteady user operation when directing the light registering camera unit 104 towards the image information presentation unit.

Having mapped the first image information and the second image information, a next step of the method of providing positioning information is recognizing at least one image element of the first image information as being included in the registered second image information (step 210). For example, suppose that an image of a person is included in the first image information. In this case, this step may include recognizing the image of a person in the second image information. This step of recognizing may be performed by the control unit 108 being provided with mapping information by the mapping unit 106.

According to another embodiment of the present invention, a complete image object may be recognized by the control unit 108 in step 210, as being present in both first and second image information.

The relative position of the camera image center with respect to the recognized person may then be determined (act 212), as one example of determining the relative position of a predefined area of the registered second image information in the first image information, with respect to a recognized image element. Determining the relative position of the camera image center is a step that may be performed by the control unit 108, according to one embodiment of the present invention.

It is noted that image information and especially motion pictures, that is video information, may be formatted in various different ways. For this reason the steps of mapping first image information, such as the presented video information and the second image information, such as the registered second image information, as well as the step of recognizing image elements as present in both these image information, may be performed in various ways. Mapping may be made at various time intervals following different criteria. Such variations would be known to one ordinary skill in the art and will therefore not be discussed hereinafter.

Next, a symbol, such as a cursor may be displayed on the presented video information at the camera image center position (step 214). In one implementation, image information providing unit 102 may provide the camera image center position to an image presentation unit on which the center position is displayed together with the video information, under the control of the control unit 108.

In one embodiment of the present invention, displaying the camera image position with the video information is followed by determining whether the obtained camera image (i.e., the second information obtained at step 204) is adequate (step 216). For example, in one implementation, control unit 108 with assistance of the mapping unit 106 may determine whether any substantial direction change of the mobile phone 100 occurred based on, for example, the degree of recognition of image elements and objects in step 210.

Various other criteria for determining whether the obtained camera image is adequate (e.g., whether a substantial change in direction of the mobile phone 100 has occurred) may be used in alternative embodiments of the invention.

For example, according to one embodiment of the present invention, displaying the camera image position with the video information (i.e., step 214) may be followed by determining whether a change of direction is detected by the camera under the control of the control unit 108.

If it is determined in step 216 that the obtained camera image is not adequate, or according to the alternative embodiment that a change of direction has been detected, processing may return to step 204. That is, new video information (e.g., a camera image) from mobile phone 100 may be obtained, under the influence of the user of the mobile phone 100.

If, however, it is determined in step 216 that the image is adequate or according to an alternative embodiment that a change of direction has not been detected, the subsequent step detects whether user interaction has occurred (step 218). User interaction may be exemplified by the removal of an element or the graphical disintegration of an image object, or the displacement of an object, to mention a few examples only. Such interactions may be performed by use of an application program, such as a video game (e.g., a shooting game), being executed by mobile phone 100.

If it is determined in step 218 that user interaction is received, processing may return to step 216, according to this embodiment of the present invention.

If, on the other hand, it is determined that no user interaction is received in step 218, the method may end (step 220).

According to another embodiment of the invention, the relative position of a predetermined area of the second image information on the first image information, such as, for example, the camera image center of the video presentation may be used for obtaining direction orders in aviation games, wherein the position of the camera center (e.g., a cursor) relative to the position of the object may be used to alter the altitude of the object in the aviation game, make the object perform turns, prepare for touch down and landing, etc., to mention a few possibilities only.

According to yet another embodiment of the invention, the camera center position may be associated with one or more recognized objects in order to change the speed, direction or conditions for the objects. One example would be to associate the camera center with a car or becoming your own car, such as in a racing game, after which any position of the camera center relative to the associated car may be used for steering and speed regulating purposes, etc. Many more variations along similar lines may also be provided.

Figure 3:
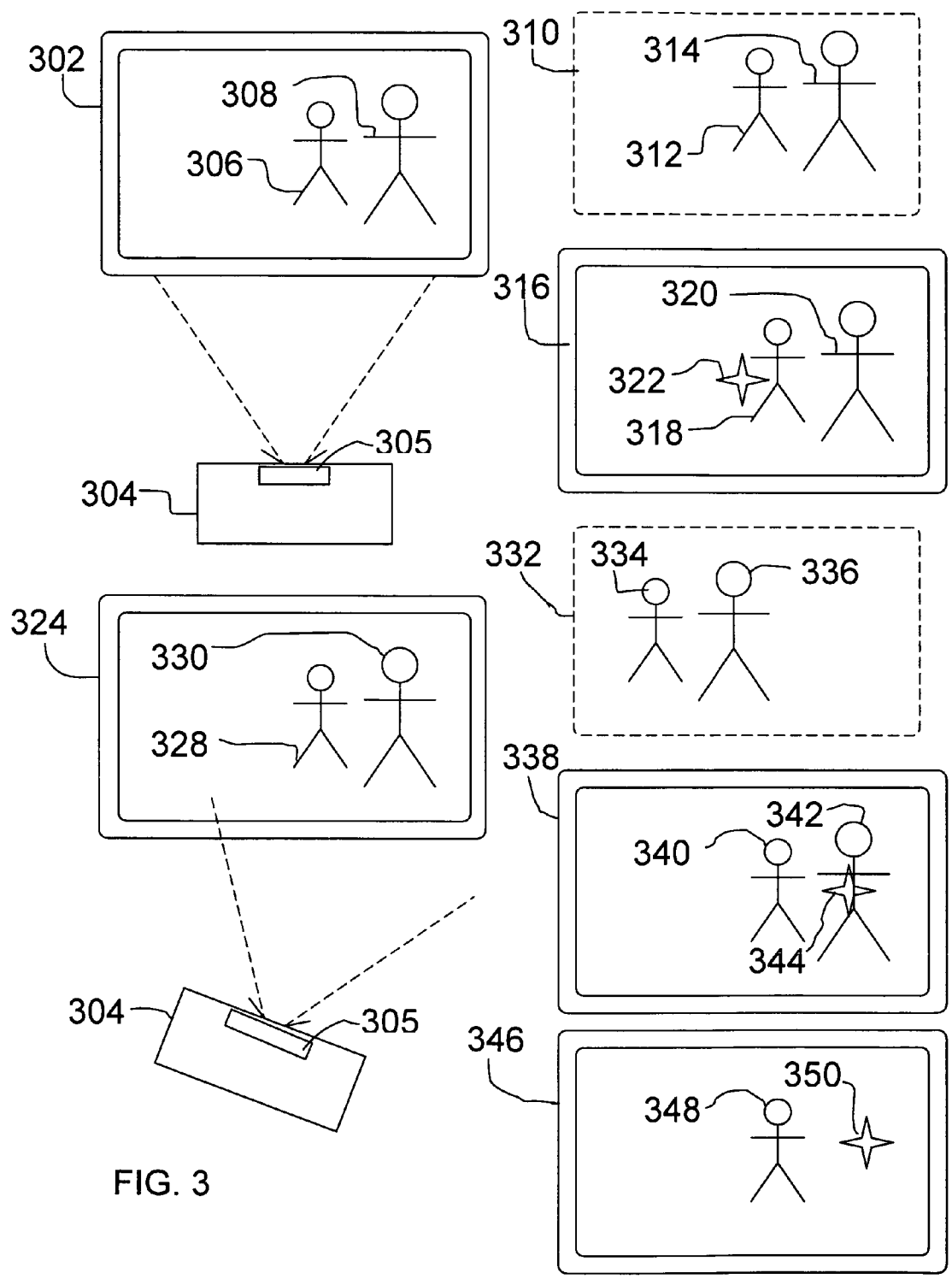
FIG. 3 schematically presents one simple example of first and second image information according to the invention.

With reference to FIG. 3, an example of using the invention for controlling purposes of an electronic game is schematically illustrated. An external image information presentation unit 302 in the form of a screen is being used for presenting the first image information, here in the form of an adult 308 to the right in the presentation and a child 306, to the adult's right positioned close to the center of the presentation.

A portable communication device 304 containing a light registering camera unit, illustrated as box 305 in FIG. 3, is directed towards the screen of image information presentation unit 302. Portable communication device 304, also referred to herein as mobile phone 304, may include the same or similar elements as portable communication device 100 described above with respect to FIG. 1. By registering incident light, the camera registers the second image information, illustrated as image 310, containing the adult 314 to the right and the child 312 to the adult's right positioned close to the center of the presentation.

Having obtained first and second image information, the step of mapping of the first and second image information is performed, as described above by mapping unit 106, in FIG. 1. After having recognized both the adult and the child as being included in both images (i.e., images displayed by image information presentation unit 302 and image 310), the camera center position is determined and information is provided to the image presentation unit to display the camera center position.

As a result, the first image presentation as displayed on screen 316 now comprises the camera center, denoted by the star 322. The position of the star 322 thus corresponds to the camera image center. This image center 322 on the screen 316 is positioned to the left of the child 318 and even further away from the adult 320.

After having determined that the camera image information was not adequate or that the camera was moved in step 216, a new image associated with the movement of the mobile phone 100 may be obtained (step 204).

This is schematically depicted by the mobile phone 304 being directed in a new direction towards screen 324, as compared to the previous exemplary picture. That is, mobile phone 304 has been pointed in a new direction. As result, the adult 330 appears to be located close to the center of the camera view and the child 328 is located to the left in the camera view.

Consequently, the second image information of the screen as viewed by the camera is denoted by 332, which shows the adult 336 close to the center of the camera picture and the child 334 to the left in the camera picture, being one example of the second image information.

By performing the steps of mapping, recognizing and displaying the camera center position on the first image presentation, the view as denoted by 338 is provided as the first image information. As expected, the adult 342 and the child 340 have not changed their position in the first image information, but a cursor indicating the camera center is now displayed as the star 344 at the position of the adult 342. This is due to the directing of the camera towards the position of the adult 330 in the first image information of the screen 324.

Screen 346 denotes the screen after the adult image has been wiped out or removed after the receipt of user input via mobile phone 304. For example, the adult may be removed via an input associated with a user playing a video game executed by mobile phone 304. The child 348 is still present and so is the star 350 denoting the camera center.

Therefore, in this example, the portable communication device 304 may be used as a pointing device and a symbol, such as a star in this example, may be used to indicate the center position at which the camera is pointed. In this manner, the portable communication device 304 acts as a pointing device associated with images on an external image presentation unit, such as the displays illustrated in screens 316, 338 and 346. When the symbol (e.g., the star) is located over the desired image, the user of portable communication device 304 may perform an action, such as remove the image, during execution of a video game being played by the user of portable communication device 304.

Described above is one example of how positioning information may be used in a simple way for controlling the video information being presented by an external image information presentation unit.

In another example, other interactions between the user of a mobile phone and a game during gaming applications are enabled according to the invention. For example, during gaming sessions using large displays, such as TV sets, monitors, etc., a mobile phone may be used as a pointer of the game. This pointer may be displayed as a gun or shooting device, allowing the user to control the virtual gun to shoot in the direction at which the camera of the mobile phone is pointed. The pointer may also be used to move images within the display.

In yet another example of the application of the invention, a combination of the camera as a pointing and registering tool, and other user interfaces is provided. For example, when pointing the camera at specific positions on the screen, certain buttons of the mobile phone are associated with special functions. Buttons may be used to activate certain actions, for instance to set a password simply by entering a certain digit while directing the camera to a specific part of the monitor/TV set. The combination of directing the mobile phone to a particular part of a monitor or display and entering a specific key may thus form a unique pattern that can be used as a secret key or for general security purposes.

Figure 4:
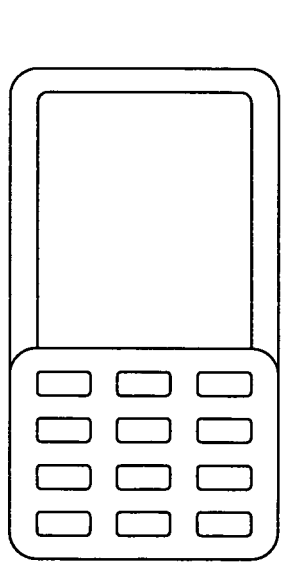
FIG. 4 illustrates a portable communication device in the form of a cellular phone, according to one embodiment of the invention.

FIG. 4 illustrates a portable communication device 40 in the form of a mobile phone, according to one embodiment of the present invention. Portable communication device 40 may include the same or similar elements as portable communication device 100 described above with respect to FIG. 1.

Figure 5:
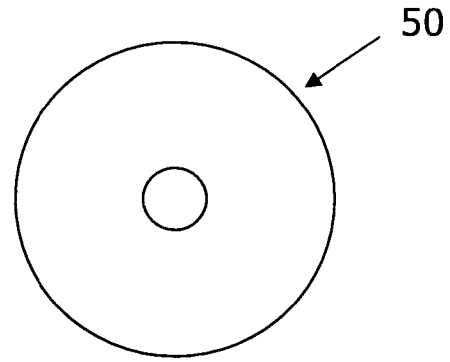
FIG. 5 illustrates a computer program product having stored thereon computer program code to make a portable communication device or a computer execute steps of a method according to one embodiment of the invention.

In addition, FIG. 5 schematically depicts a computer program product 50 according to one embodiment of the invention, having thereon computer program code means. When the computer program code means, comprised on the computer program product, is loaded in a computer or portable communication device, said computer or portable communication device, executes providing of first image information from the portable communication device of the computer, to be presented by an image information presentation unit, registering second image information by the camera of the portable communication device under control of the user of the portable communication device, mapping presented first image information and registered second image information, recognizing at least one image element of the presented first image information as being included in the second registered image information, and determining the position of a predefined area of the second registered image information in relation to the recognized at least one image element, in order to enable using the determined relative position of the predefined area for controlling purposes of the first image information being presented.

The computer program product may be provided as a CD-ROM disc according to one embodiment of the invention. However, the computer program product 50 can alternatively be provided as another type of disc such as a digital video disc (DVD), a hard disc, or be provided as a memory or other storage capacity, such as a flash-based memory, for example a memory stick or a USB (Universal Serial Bus) memory or even a memory of the type being volatile.

It is emphasized that this invention can be varied in many ways, of which the embodiments discussed above only are examples of a few. These different embodiments are hence non-limiting examples. The scope of the invention, however, is only limited by the subsequently following claims.

According to one alternative embodiment of the invention, the steps of the method as described above may be executed in a different order, without deviating from the scope of the invention. In addition, some steps may be formed concurrently. Still further, some steps of the method may be omitted, following yet a different embodiment of the invention.

The number of steps may moreover be changed, by for instance incorporating a few steps in others or dividing the function of certain steps in other steps, such that novel steps are created but without deviating from the overall function of the steps.

The units as comprised in the portable communication device, as shown in FIG. 1, may at least partly be comprised in other performing units, without deviating from the invention. Other units may co-exist according to other embodiments of the invention.

Aspects of the invention, as described above, provide, among other advantages, positioning of an image center relative to recognized surrounding image elements, which enables, for example, more advanced gaming using mobile phones in connection with external image presentation units.

The invention may also provide a flexible positioning tool, which also can be used for controlling objects based on relative positioning of cursor movements.

The scope of the invention is defined by the claims and their equivalents.

What is claimed is:

1. A method of providing positioning information related to a presentation of image information for a portable communication device, comprising:

providing first image information to be presented by an image information presentation unit;

obtaining the first image information by the portable communication device under control of the user of the portable communication device;

registering second image information by the camera of the portable communication device;

mapping presented first image information and registered second image information;

recognizing at least one image element of the presented first image information as being included in the registered second image information; and determining the position of a predefined area of the registered second image information in relation to the recognized at least one image element, wherein the determined relative position of the predefined area is used for controlling purposes of the first image information being presented.

2. The method of claim 1, further comprising:

sending predefined area position information for displaying the predefined area position on the image information presentation unit.

3. The method of claim 1, wherein the step of determining the position of the predefined area comprises determining the position of the center area of the registered second image information.

4. The method of claim 1, further comprising:

obtaining updated directing of the camera of the portable communication device under the control of the user of the portable communication device.

5. The method of claim 1, further comprising:

receiving user input by the portable communication device, which user input is used as input data for controlling the first image information being presented.

6. The method of claim 4, further comprising:

controlling the first image information being presented based on at least one of the obtained updated directing or received user input.

7. The method of claim 1, further comprising:

using the determined relative position of the predefined area for controlling the first image information being presented.

8. A portable communication device for providing positioning information related to a presentation of a first image information, comprising:

an image information providing unit, arranged to provide a first image information to an image information presentation unit;

a light registering camera unit, arranged to register second image information when being directed towards the image information presentation unit;

a mapping unit, connected to the light registering camera unit and arranged to map the first image information and the second image information; and a control unit arranged to control providing of the first image information to an image information unit, to control registering second image information by the light registering camera unit, and to control mapping of the first image information and the second image information, and further arranged to recognize at least one image element of the first image information as being included in the second image information, to determine the position of a predefined area of the second image information in relation to the recognized at least one image element, and use the determined relative position of the predefined area to control the first image information being presented.

9. The portable communication device of claim 8, wherein the control unit is further configured to use the determined relative position of the predefined area to control the first image information being presented.

10. The portable communication device of claim 8, wherein the portable communication device comprises a mobile phone.

11. A computer program product comprising a computer readable medium, having stored thereon computer program code for execution by a portable communication device or a computer, when said computer program code is loaded in the portable communication device or the computer, to cause the portable communication device or computer to perform a method comprising:

providing of first image information from the portable communication device or the computer, to be presented by an image information presentation unit;

registering second image information by the camera of the portable communication device;

mapping presented first image information and registered second image information;

recognizing at least one image element of the presented first image information as being included in second registered image information; and determining the position of a predefined area of the second registered image information in relation to the recognized at least one image element.

12. The computer program product of claim 11, wherein the method further comprises:

using the determined relative position of the predefined area for controlling the first image information being presented.

* * * * *